United States Patent [19]

Morales

[11] Patent Number: 5,408,276
[45] Date of Patent: Apr. 18, 1995

[54] SAFE VIEWING DISTANCE FOR A TELEVISION BY MEANS OF AN ANTENNA INTERRUPT DEVICE

[76] Inventor: Nicholas S. Morales, 829 NW. 14th Ct., Miami, Fla. 33125

[21] Appl. No.: 988,336

[22] Filed: Dec. 9, 1992

Related U.S. Application Data

[63] Continuation-in-part of Ser. No. 700,291, May 15, 1991, abandoned.

[51] Int. Cl.$^6$ ............................................. H04N 5/64
[52] U.S. Cl. .................................. 348/818; 348/143; 340/573
[58] Field of Search ...................... 358/194.1, 188, 245, 358/105, 161; 340/567, 573, 552; 455/2; H04N 5/64, 5/65, 5/44; 348/729, 725, 731, 818, 819, 725, 143

[56] References Cited

U.S. PATENT DOCUMENTS

| | | | |
|---|---|---|---|
| 4,321,593 | 5/1982 | Ho et al. | 340/541 |
| 4,417,278 | 11/1983 | Hensleigh | 358/188 |
| 4,641,191 | 2/1987 | Sutton | 358/168 |
| 4,716,469 | 12/1987 | Kim | 358/245 |
| 4,831,448 | 5/1989 | Park | 358/188 |
| 4,835,614 | 5/1989 | Ryu | 358/194.1 |
| 4,843,464 | 6/1989 | Choi | 358/105 |
| 4,853,678 | 8/1989 | Bishop | 340/573 |

FOREIGN PATENT DOCUMENTS

| | | | |
|---|---|---|---|
| 0221280 | 9/1987 | Japan | H04N 5/64 |
| 0285083 | 11/1988 | Japan | H04N 5/64 |

*Primary Examiner*—James J. Groody
*Assistant Examiner*—Chris Grant

[57] ABSTRACT

A signal interrupt device connected externally to an electronic device such as a television set to sense when a person is within a predetermined minimum distance from the surface of the television set including a radio frequency sensor connected in series with the wire or cable providing incoming T.V. signals to the television set and a normally closed switch which is effectively opened when a person is sensed within the predetermined minimum distance, consequently interrupting the signals to the television.

2 Claims, 1 Drawing Sheet

SAFE VIEWING DISTANCE FOR A TELEVISION BY MEANS OF AN ANTENNA INTERRUPT DEVICE

BACKGROUND OF THE INVENTION

This is a continuation-in-part application of patent application Ser. No. 07/700,291 filed on May 15, 1991, now abandoned.

FIELD OF THE INVENTION

This invention relates to an electronic means to interrupt operation of an electronically energized device such as a television set, so that when a person is within a predetermined distance range for more than a predetermined time period, operation of the device will be interrupted.

DESCRIPTION OF THE PRIOR ART

In the past, there has been a concern that children, for example, who often sit directly in front of a television set, will have a deleterious effect on their eyes. It is also known that being too close to a television set when turned on provides low doses of harmful radiation over an extended period of time. The problem which many people consider serious is how to keep the face of children out of the television set, that is, too close to it. The prior art has made attempts at controlling this long-standing problem, however, these devices have, for the most part, been formed integrally within a television set or other electronic device and installed during the manufacturing process.

U.S. Pat. No. 4,321,593, Ho, et al., discloses a specific television set with supervisory functions for suppressing its video display and having the dual capability of serving as a burglar alarm. The Ho, et al. television set generally comprises a device integrally installed and connected with the internal circuitry of the television set.

U.S. Pat. No. 4,835,614, Ryu, discloses a microcomputer controlled device which generates and transmits infrared signals through an infrared emitting diode installed in a television. When an object is too close to the television, the video signal is interrupted.

U.S. Pat. No. 4,417,278, Hensleigh, et al., describes a detector system which is mounted on a television receiver and can be installed during manufacture or to an existing television set. The device, using acoustical signals, determines the presence of an object within a specific distance to the television. When an object is determined to be in proximity, an interference generator produces a high frequency voltage which is transmitted into a dipole radiator through a transformer element, thereby causing disruption of either the video or audio outputs of the television receiver.

The present invention attempts to provide a simple device which may be externally connected in-line along a TV antenna wire or cable leading to any conventional television set such that when an object enters into the area immediately in front of the television screen, the signal coming from the antenna or cable is completely interrupted.

SUMMARY OF THE INVENTION

This invention is of a normally closed switch disposed in external connection with a conventional television, which permits the signal from an antenna, a cable, or a VCR, to reach the television receiver and signal display means but which also includes, in the switch circuit, a sensing means, to open the switch for a predetermined period of time if there has been prolonged movement close to the television set. In a preferred embodiment, a timer means is provided so that, if a person merely passes the television set, the switch will not be operated In referring to the "switch circuit, " it will be appreciated that alternative means may be employed other than a switch, for example, an electronic switching device effective to accomplish the switching function.

DESCRIPTION OF THE PREFERRED EMBODIMENT

Figure 1:
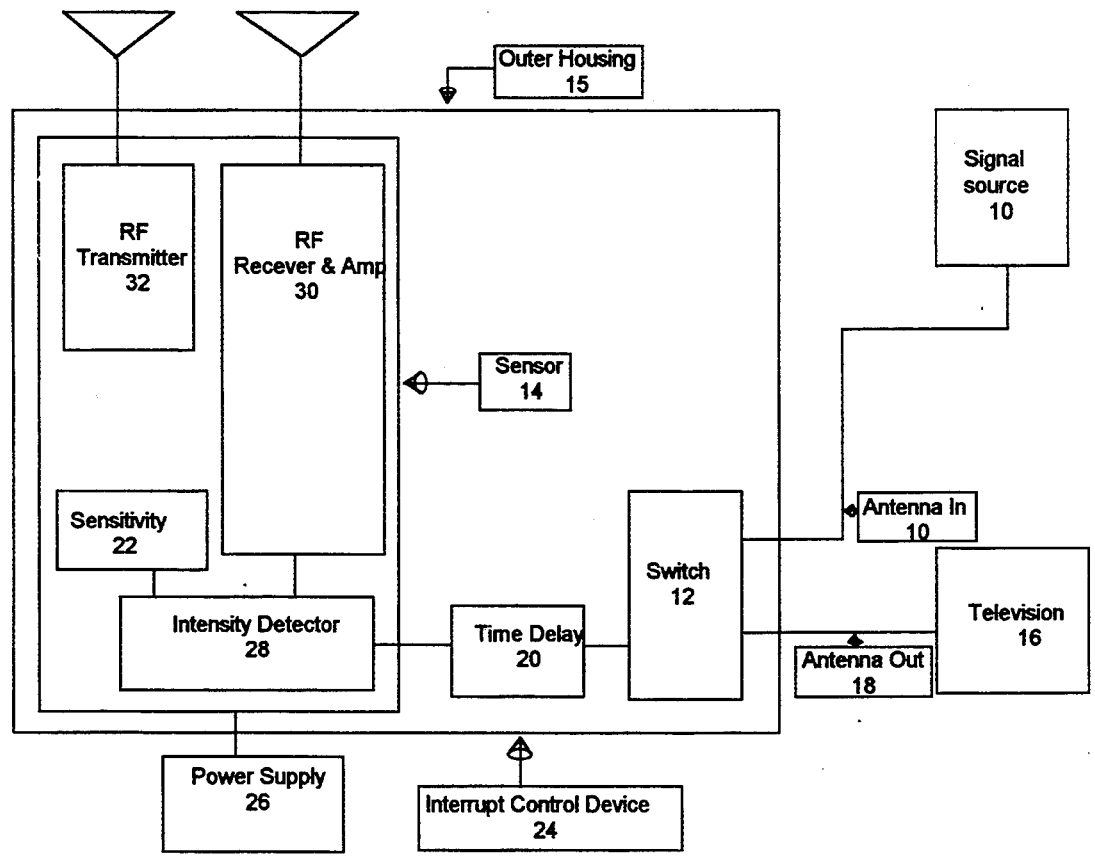
FIG. 1 is a schematic view of a device in accordance with this invention.

Referring now to FIG. 1, there is shown schematically a signal source 10 which can be a television antenna, a cable, or a VCR which is linked to an electronic device such as a conventional television 16 by a circuit means 18. An interrupt control device 24 which receives electrical current from a power supply 26 is disposed in series relation between the signal source 10 and the television 16, wherein the interrupt control device 24 is adapted to interrupt the signal to the television 16 upon detecting a person entering within a predetermined distance from the television 16.

The interrupt control device 24 is comprised of an outer housing 15 which contains therein a normally closed switch 12 in series relation with the signal source 10. Normally, when the switch 12 is closed, the signal generated by the signal source 10 will continue through the circuit means 18 and through control device 24 to reach the television 16. However, when a person gets too close to the television 16 and is sensed, the switch 12 is opened, thereby interrupting the signal to the television 16. A radio frequency sensor means 14 is linked to the switch 12, wherein the sensor means 14 detects the presence of an object within a predetermined area, and upon detection thereof, effectively opens the switch 12 and interrupts reception to the television 16.

The sensor means 14 includes an RF transmitter 32, an RF receiving and amplifying means 30, and a signal intensity detecting means 28. The transmitter 32 steadily transmits a weak radio frequency signal in the vicinity of 120 MHZ, which is in turn continually received and amplified by the receiving and amplifying means 30. When an object enters into a predetermined field, the wave generated and transmitted by the transmitter 32 will be partially absorbed by the object, thereby creating a drop in the signal received by the receiving and amplifying means 30. The signal intensity detecting means 28 monitors the intensity of the signal received by the receiving and amplifying means 30 to determine a reduction in signal strength. The sensitivity threshold of the signal intensity detecting means 28 can be controlled by a sensitivity adjustment means 22 such that degree of signal reduction which causes the normally closed switch 12 to open and consequently interrupt the signal to the television 16 is variable. Hence, the distance between an object and the television which causes interruption of the signal to the television 16 is also variable. For example, the adjustment means 22 can be set to allow the signal intensity detecting means 28 to detect an object located 4 feet from the television 16 such that when the object moves into the targeted field of 4 feet, the signal intensity detecting means 28 detects a reduction of signal strength received by the receiving and amplifying means 30 causing the normally closed switch 12 to open and disrupt the signal from the signal source 10 to the television 16.

The radio frequency sensor means 14 further contains a time delay adjustment 20 in series with the switch 12 and the radio frequency sensor means 14. The time delay adjustment 20 controls the amount of time a reduction in signal strength monitored by the intensity detecting means 28 must be detected before the switch 12 is opened, which in turn, disrupts the signal to the television 16. The time delay adjustment 20 can be set so as to prevent the interruption of signal to the television 16 when a person merely passes in front of the screen. For example, when a person walks by a television screen, a signal strength reduction is picked up by the intensity detecting means 28 for possibly three seconds. The time delay adjustment 20 can be set to delay the opening of the normally closed switch 12 until such a signal strength reduction is picked up for at least 5 seconds, thereby enabling a person to walk in front of the screen without disrupting reception.

When a signal strength drop is detected for more than the present amount of time by the intensity detecting means 28, the switch 12 is opened, thereby interrupting the signal carried by the circuit 18 to the television 16. When the object in the targeted field is removed, the strength of the signal read by the intensity detecting means 28 returns to its original level thereby closing switch 12 and restoring the reception of the signal by the television.

Figure 2:
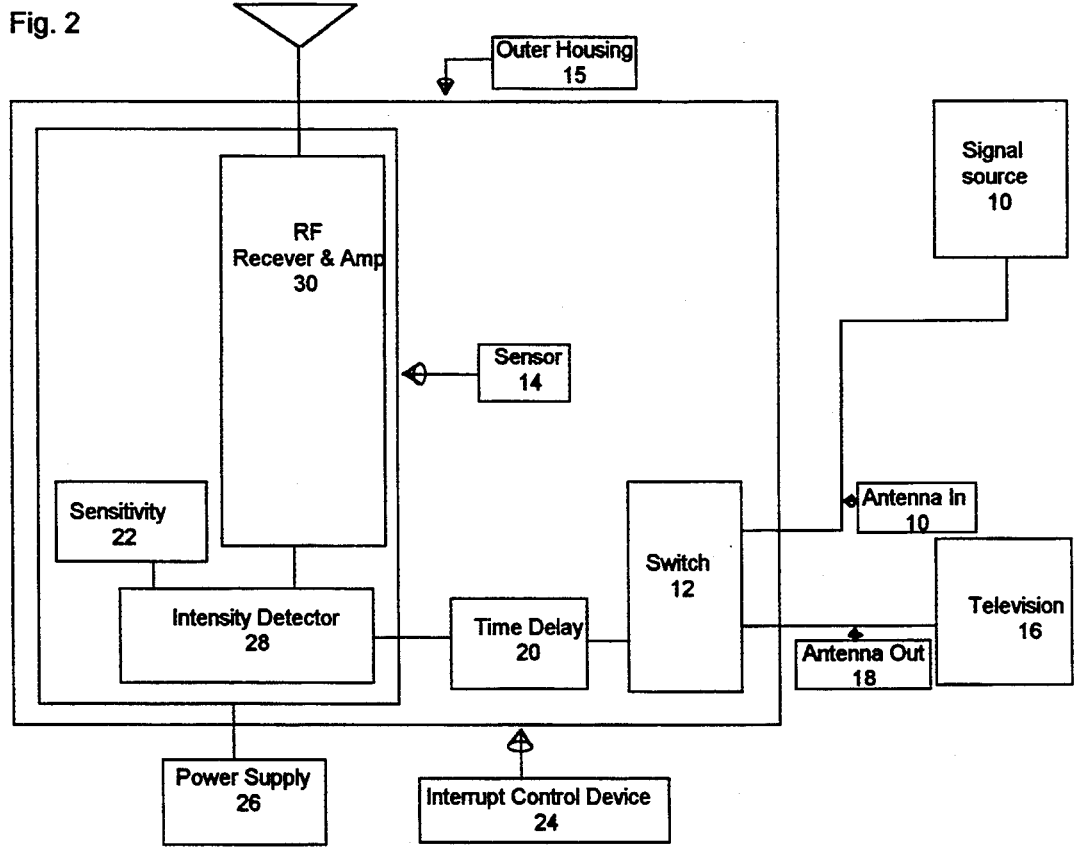
FIG. 2 is a schematic view of an alternative embodiment of the device.

In a second embodiment shown in FIG. 2, an RF broadband receiving and amplifying means 30' picks up FM signals in the broadband range of 80–110 MHZ that are inherently present in the environment. The second embodiment differs from the first above described embodiment in that the RF sensor means 14' of the second embodiment does not contain an RF signal transmitter but instead receives and detects drops in the strength of FM signals which exist in the local environment. The other components of the interrupt control device 24' of the second embodiment function in the same manner as their corresponding component of the first embodiment previously described.

While this invention has been shown and described in what is considered to be practical and preferred embodiments, it is recognized that departures may be made within the spirit and scope of this invention which should, therefore, not be limited except as set forth in the claims hereinafter and within the doctrine of equivalents.

What is claimed is:

1. A signal interrupt device adapted to be externally connected to a television of the type which receives a signal directly from an antenna, a vcr or cable source, the device comprising:
   an outer housing,
   a normally closed switch connected in series relation between a line providing the signal and the television,
   a sensor means connected to said switch and structured to detect the presence of a person within a predetermined minimum distance relative to said television, said switch being responsive to inputs from said sensor means to interrupt said signal to said television by operatively changing from a normally closed position to an open position,
   a time delay adjustment means connected between said sensor means and said switch and being structured to delay said inputs to said switch from said sensor means for a predetermined time period, so as to allow the person to quickly pass within said predetermined minimum distance and not cause interruption of said signal of the television,
   a power supply connection means for connecting the device to an electrical power source for supplying electrical power thereto, and
   said sensor means including:
      a transmitting means structured to transmit a weak radio frequency signal,
      a receiving means for receiving and amplifying said weak radio frequency signal,
      an intensity detecting means connected to said time delay adjustment means and structured for detecting a reduction in the strength of said weak radio signal received by said receiving means,
      a sensor adjustment means connected to said intensity detecting means and structured to vary a range of said predetermined minimum distance within which said person is detected.

2. A signal interrupt device adapted to be externally connected to a television of the type which receives a signal directly from an antenna, a vcr or cable source, the device comprising:
   an outer housing,
   a normally closed switch connected in series relation between a line providing the signal and the television,
   a sensor means connected to said switch and structured to detect the presence of a person within a predetermined minimum distance relative to said television, said switch being responsive to inputs from said sensor means to interrupt said signal to said television by operatively changing from a normally closed position to an open position,
   a time delay adjustment means connected between said sensor means and said switch and being structured to delay said inputs to said switch from said sensor means for a predetermined time period, so as to allow the person to quickly pass within said predetermined minimum distance and not cause interruption of said signal of the television,
   a power supply connection means for connecting the device to an electrical power source for supplying electrical power thereto, and
   said sensor means including:
      a receiving means for receiving broadband radio frequency signal from the environment, and
      an intensity detecting means connected to said time delay adjustment means and structured for detecting a reduction in the strength of said broadband radio frequency signals received by said receiving means,
      a sensor adjustment means connected to said intensity detecting means and structured to vary a range of said predetermined minimum distance within which said person is detected.

* * * * *